(12) United States Patent
Aratani et al.

(10) Patent No.: US 9,317,924 B2
(45) Date of Patent: Apr. 19, 2016

(54) INFORMATION PROCESSING APPARATUS, THREE-DIMENSIONAL POSITION CALCULATION METHOD, AND PROGRAM

(75) Inventors: Shinichi Aratani, Kawasaki (JP); Kazuki Takemoto, Kawasaki (JP); Takashi Aso, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/169,662

(22) Filed: Jun. 27, 2011

(65) Prior Publication Data

US 2012/0002841 A1 Jan. 5, 2012

(30) Foreign Application Priority Data

Jun. 30, 2010 (JP) ................. 2010-149713

(51) Int. Cl.
*G06K 9/00* (2006.01)
*G06T 7/00* (2006.01)
*H04N 13/00* (2006.01)

(52) U.S. Cl.
CPC ............ *G06T 7/0075* (2013.01); *G06T 7/0065* (2013.01); *G06T 2207/10012* (2013.01); *G06T 2207/10021* (2013.01); *H04N 2013/0074* (2013.01)

(58) Field of Classification Search
CPC .................. G06T 7/0083; G06T 2207/20144; G06T 7/0075; G06T 2207/10012
See application file for complete search history.

(56) References Cited

U.S. PATENT DOCUMENTS 5,432,712 A * 7/1995 Chan ............................ 382/191
5,974,170 A * 10/1999 Louis et al. .................... 382/154
2002/0061131 A1 * 5/2002 Sawhney et al. ............... 382/154
2004/0022437 A1 * 2/2004 Beardsley ...................... 382/199
2004/0125103 A1 * 7/2004 Kaufman et al. .............. 345/419
2005/0002559 A1 * 1/2005 Terauchi et al. ............... 382/154

(Continued)

FOREIGN PATENT DOCUMENTS

EP 1445736 A2 8/2004
WO 9119265 A1 12/1991

OTHER PUBLICATIONS

Hayashi, K., Kato, H., and Nishida, S., Occlusion Detection of Real Objects using Contour Based Stereo Matching, 2005, Proceedings of the 2005 International Conference on Augmented Tele-existence, pp. 180-186.*

(Continued)

*Primary Examiner* — Stephen R Koziol
*Assistant Examiner* — Jonathan S Lee
(74) *Attorney, Agent, or Firm* — Canon USA Inc. IP Division

(57) ABSTRACT

An information processing apparatus includes a region segmentation unit configured to segment each of a plurality of images shot by an imaging apparatus for shooting an object from a plurality of viewpoints, into a plurality of regions based on colors of the object, an attribute determination unit configured to determine, based on regions in proximity to intersections between scanning lines set on the each image and boundary lines of the regions segmented by the region segmentation unit in the each image, attributes of the intersections, a correspondence processing unit configured to obtain corresponding points between the images based on the determined intersections' attributes, and a three-dimensional position calculation unit configured to calculate a three-dimensional position of the object based on the obtained corresponding points.

17 Claims, 15 Drawing Sheets

(56) References Cited

U.S. PATENT DOCUMENTS

| | | | | |
|---|---|---|---|---|
| 2005/0008220 | A1* | 1/2005 | Miyazaki | 382/154 |
| 2005/0035961 | A1* | 2/2005 | Grau | 345/419 |
| 2005/0069223 | A1* | 3/2005 | Tanimura et al. | 382/284 |
| 2005/0196034 | A1* | 9/2005 | Hattori | B60R 1/00 382/154 |
| 2006/0193509 | A1* | 8/2006 | Criminisi et al. | 382/154 |
| 2007/0003131 | A1* | 1/2007 | Kaufman | 382/154 |
| 2007/0031037 | A1* | 2/2007 | Blake et al. | 382/173 |
| 2007/0098265 | A1* | 5/2007 | Shen et al. | 382/209 |
| 2007/0110298 | A1* | 5/2007 | Graepel et al. | 382/154 |
| 2007/0122028 | A1* | 5/2007 | Sun et al. | 382/154 |
| 2009/0003687 | A1* | 1/2009 | Agarwal et al. | 382/154 |
| 2009/0129666 | A1* | 5/2009 | Goevert et al. | 382/154 |
| 2009/0245584 | A1* | 10/2009 | Masuda | 382/106 |
| 2010/0060632 | A1* | 3/2010 | Lefevre et al. | 345/419 |
| 2010/0128972 | A1* | 5/2010 | Koizumi et al. | 382/154 |
| 2010/0303340 | A1* | 12/2010 | Abraham et al. | 382/154 |
| 2012/0155743 | A1* | 6/2012 | Kim | 382/154 |
| 2013/0016097 | A1* | 1/2013 | Coene et al. | 345/419 |

OTHER PUBLICATIONS

Takagi, A., Yamazaki, S., Saito, Y., and Taniguchi, N., Development of a Stereo Video See-through HMD for AR Systems, 2000, International Symposium on Augmented Reality, pp. 68-77.*

Belyer, M. and Gelautz, M., A layered stereo matching algorithm using image segmentation and global visibility constraints, 2005, Journal of Photogrammetry & Remote Sensing, vol. 59, pp. 128-150.*

North, A. and Uther, W., Robust and Efficient Robot Vision Through Sampling, 2007, Robotic Soccer, ISBN 978-3-902613-21-9, pp. 447-472.*

Display Technologies, Canon Global, no publisher, no publishing date, http://www.canon.com/technology/canon_tech/explanation/display_tech.html.*

Di Stefano, L., Marchionni, M., and Mattoccia, S. A fast area-based stereo matching algorithm, 2004, Image and Vision Computing, vol. 22, pp. 983-1005.*

Scharstein D et al, XP010582733, "A Taxonomy and Evaluation of Dense Two-Frame Stereo Correspondence Algorithms", Proceedings of the IEEE Workshop on Stereo and Multi-Baseline Vision, 2001, IEEE Comput. Soc, Dec. 9, 2001, p. 131-140.

Dhond U R et al, XP000127015, "Structure from Stereo—A Review", IEEE Transactions on Systems, Man and Cybernetics, vol. 19, No. 6, Nov. 1, 1989, p. 1489-1510.

Baker H H et al, XP001056494, "Depth From Edge and Intensity Based Stereo", Proceedings of the International Joint Conference on Artifical Intelligence, Jan. 1, 1981, p. 631-636.

Yuichi Ohta et al, XP011242827, "Stereo by Intra-and Inter-Scanline Search Using Dynamic Programming", IEEE Transactions on Pattern Analysis and Machine Intelligence,vol. PAMI-7, No. 2, Mar. 1, 1985, p. 139-154.

Lawrence Zitnick C et al, XP019534960 ,"Stereo for Image-Based Rendering using Image Over-Segmentation", International Journal of Computer Vision, vol. 75, No. 1, Feb. 14, 2007, p.49-65.

Hideyuki Tamara, "Computer Image Processing", Ohmsha, Ltd., 2002, pp. 226-231.

Jun Sato, "Computer Vision—Geometry of Vision", Corona Publishing Co., Ltd., 1999, pp. 80-83.

* cited by examiner

IMAGE BY IMAGING
APPARATUS 100

IMAGE BY IMAGING
APPARATUS 110

○ : POSITIVE SIGN
△ : NEGATIVE SIGN

○: POSITIVE SIGN
△: NEGATIVE SIGN

IMAGE BY IMAGING
APPARATUS 100

IMAGE BY IMAGING
APPARATUS 110

INFORMATION PROCESSING APPARATUS, THREE-DIMENSIONAL POSITION CALCULATION METHOD, AND PROGRAM

BACKGROUND OF THE INVENTION

1. Field of the Invention

The present invention relates to an information processing apparatus, a three-dimensional position calculation method, and a program.

2. Description of the Related Art

In recent years, researches on the mixed reality (MR) technology have been actively undertaken. The MR technology is a technology for seamlessly mixing the virtual space generated by a computer with the real space. The MR technology is expected to be applied to diverse fields, for example, assembly support operations where assembly procedures are displayed with wiring conditions superimposed thereon, and surgery support operations where a patient's body surface is displayed with body's internal conditions superimposed thereon.

To allow a user to feel that a virtual object really exists in the real space, it is essential to achieve geometric consistency between the virtual object and the real space. There are two different geometric consistency schemes in the mixed reality: a consistency scheme for conforming the coordinate system of the real space to the coordinate system of the virtual space, and a consistency scheme for correctly expressing an anteroposterior relation between real and virtual objects. A problem dealing with the former consistency scheme is also referred to as a registration problem in the mixed reality. Various researches on the registration problem are currently being conducted. A problem dealing with the latter consistency scheme is also referred to as an occlusion problem. In particular, the occlusion problem is crucial also for a video see-through type MR system which superimposes a virtual object on an image shot by a camera. The present application deals with the latter consistency, i.e., the occlusion problem.

To correctly express an anteroposterior relation between real and virtual objects, i.e., hiding (occlusion), it is necessary to obtain three-dimensional position information for the real or virtual object to be hidden. Specifically, an information processing apparatus compares three-dimensional position information for the real object with three-dimensional position information for the virtual object and, if the real object is anterior to the virtual object, displays the shot real object's image on the anterior side. If the virtual object is anterior to the real object, the information processing apparatus can display the virtual object on the anterior side. In this processing, since there is a known three-dimensional model for the virtual object, the information processing apparatus can calculate a three-dimensional position of the virtual object with respect to the viewpoint. However, since the three-dimensional position of the real object with respect to the viewpoint remains unknown only by shooting the real object, the information processing apparatus needs to obtain the three-dimensional position of the real object.

A technique for measuring a three-dimensional position of a real object will be described below. A general three-dimensional position measurement technique applies matching processing to a point of interest in images shot by a stereo camera, based on epipolar constraint and pixel patch luminance information. Specifically, with respect to a point of interest in one image shot by the stereo camera, the information processing apparatus recognizes as a corresponding point candidate a point on an epipolar line in the other image shot thereby. Then, the information processing apparatus performs pattern matching between pixel patches around each point remaining as a corresponding point candidate and pixel patches around a point of interest to obtain corresponding points with sufficient accuracy. (Hideyuki Tamura, "Computer Image Processing", Ohmsha, Ltd., 2002, and Jun Sato, "Computer Vision—Geometry of Vision", Corona Publishing Co., Ltd., 1999).

The conventional stereo matching, a general three-dimensional position measurement technique, cannot perform real-time processing in some cases because of a large amount of calculations in correspondence processing through pattern matching based on pixel value correlations.

SUMMARY OF THE INVENTION

The present invention is directed to an information processing apparatus capable of stably calculating an object's three-dimensional position at high speed.

According to an aspect of the present invention, an information processing apparatus includes: a region segmentation unit configured to segment each of a plurality of images shot by an imaging apparatus for shooting an object from a plurality of viewpoints, into a plurality of regions based on colors of the object; an attribute determination unit configured to determine, based on regions in proximity to intersections between scanning lines set on the each image and boundary lines of the regions segmented by the region segmentation unit in the each image, attributes of the intersections; a correspondence processing unit configured to obtain corresponding points between the images based on the determined intersections' attributes; and a three-dimensional position calculation unit configured to calculate a three-dimensional position of the object based on the obtained corresponding points.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the following exemplary embodiments of the present invention, a three-dimensional position calculation method will be described based on a three-dimensional position measurement apparatus capable of measuring, based on images shot by two imaging apparatuses located so as to provide parallelly aligned optical-axis directions and the same viewpoint heights, a three-dimensional position of a real object as an exemplary object with respect to the imaging apparatuses.

Figure 1:
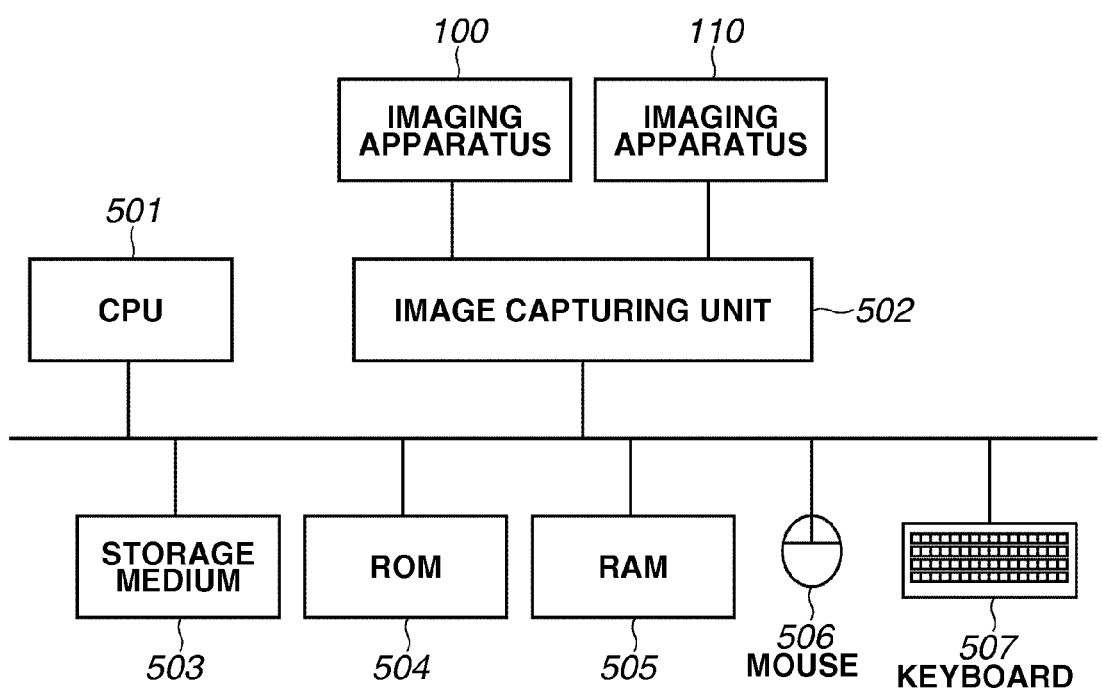
FIG. 1 illustrates an exemplary hardware configuration of a three-dimensional position measurement apparatus, and positions of imaging apparatuses therein.
Figure 2:
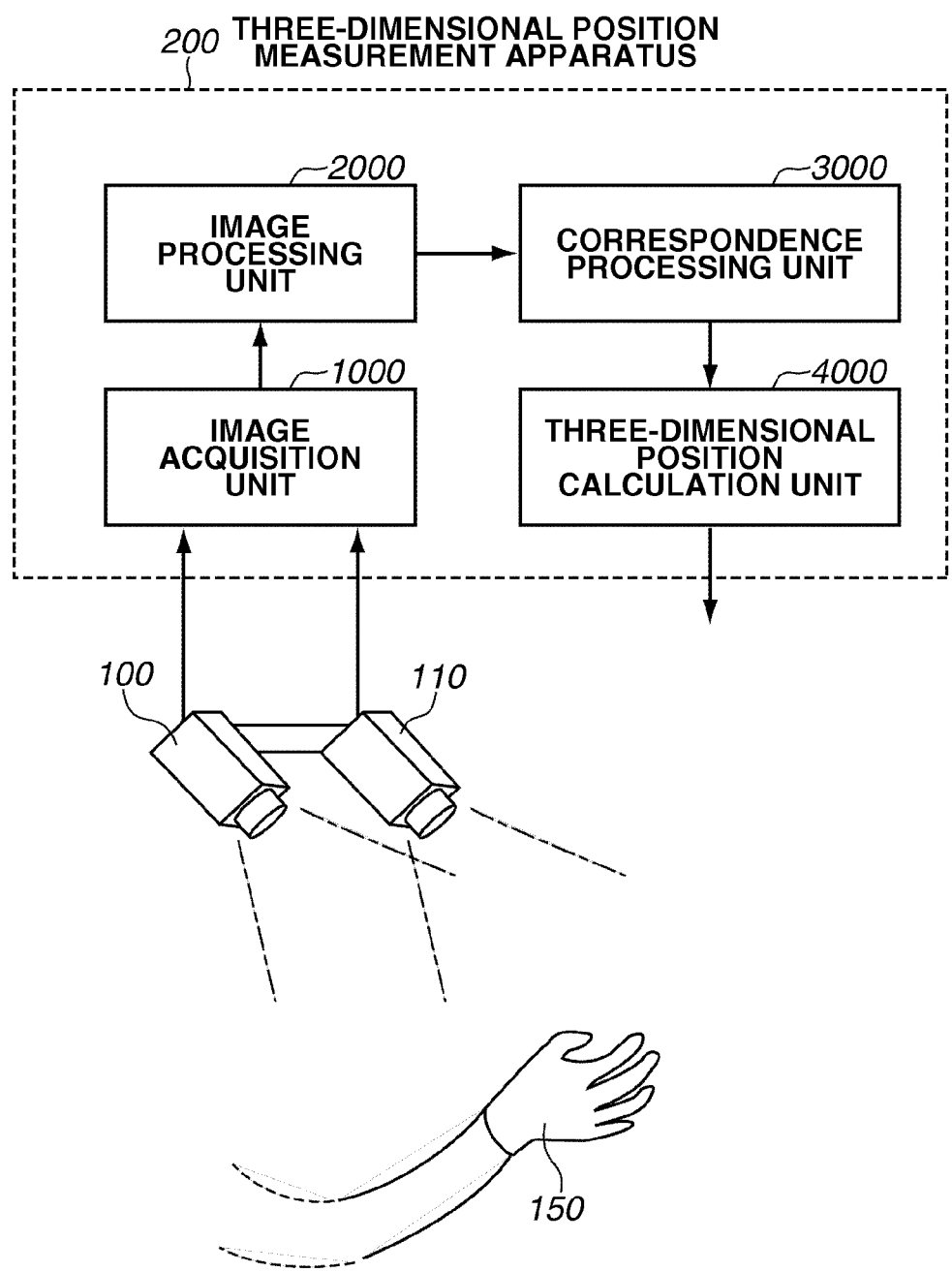
FIG. 2 illustrates an exemplary functional configuration of the three-dimensional position measurement apparatus.

FIG. 1 illustrates an exemplary hardware configuration of a three-dimensional position measurement apparatus 200, and positions of the imaging apparatuses therein. The hardware configuration of the three-dimensional position measurement apparatus 200 illustrated in FIG. 1 is equivalent to that of a personal computer. The three-dimensional position measurement apparatus 200, an exemplary information processing apparatus, includes an image capturing unit 502 and a storage medium 503 connected thereto. The image capturing unit 502 captures images respectively shot by imaging apparatuses 100 and 110 into the computer, and corresponds to an image acquisition unit 1000 (FIG. 2). The image capturing unit 502 is, for example, a video capture board. The image capturing unit 502 may be any apparatus capable of capturing images shot by cameras (imaging apparatuses) into the computer. A central processing unit (CPU) 501 executes programs stored in a storage medium 503, a read-only memory (ROM) 504, a random access memory (RAM) 505, and an external storage (not illustrated). Each of an image processing unit 2000 (FIG. 2), a correspondence processing unit 3000 (FIG. 2), and a three-dimensional position calculation unit 4000 (FIG. 2) is implemented when the CPU 501 executes a relevant program. Each processing unit stores and reads information to/from the storage medium 503.

FIG. 2 illustrates an exemplary functional configuration of the three-dimensional position measurement apparatus 200.

As illustrated in FIG. 2, the three-dimensional position measurement apparatus 200 includes the image acquisition unit 1000, the image processing unit 2000, the correspondence processing unit 3000, and the three-dimensional position calculation unit 4000. The three-dimensional position measurement apparatus 200 measures (calculates) a three-dimensional position of a real object based on the respective images shot by the imaging apparatuses 100 and 110, and outputs three-dimensional position information.

First of all, each of the imaging apparatuses 100 and 110, for example video cameras, simultaneously captures an image of a scene where a real object 150 exists. In the present exemplary embodiment, internal camera parameters of the imaging apparatus 100, such as the focal length and lens distortion coefficient, are assumed to be known since they are obtained in advance by using a known method. External camera parameters for a relative position and orientation between the imaging apparatuses 100 and 110 are assumed to be known since the imaging apparatuses 100 and 110 are located so as to provide parallelly aligned optical-axis directions and the same viewpoint heights.

The image acquisition unit 1000 captures images respectively shot by the imaging apparatuses 100 and 110 into the computer. The image acquisition unit 1000 is, for example, a video capture card installed in a personal computer (PC). In the present exemplary embodiment, the image acquisition unit 1000 applies lens distortion correction to the acquired image and, therefore, no image distortion is assumed.

Figure 3:
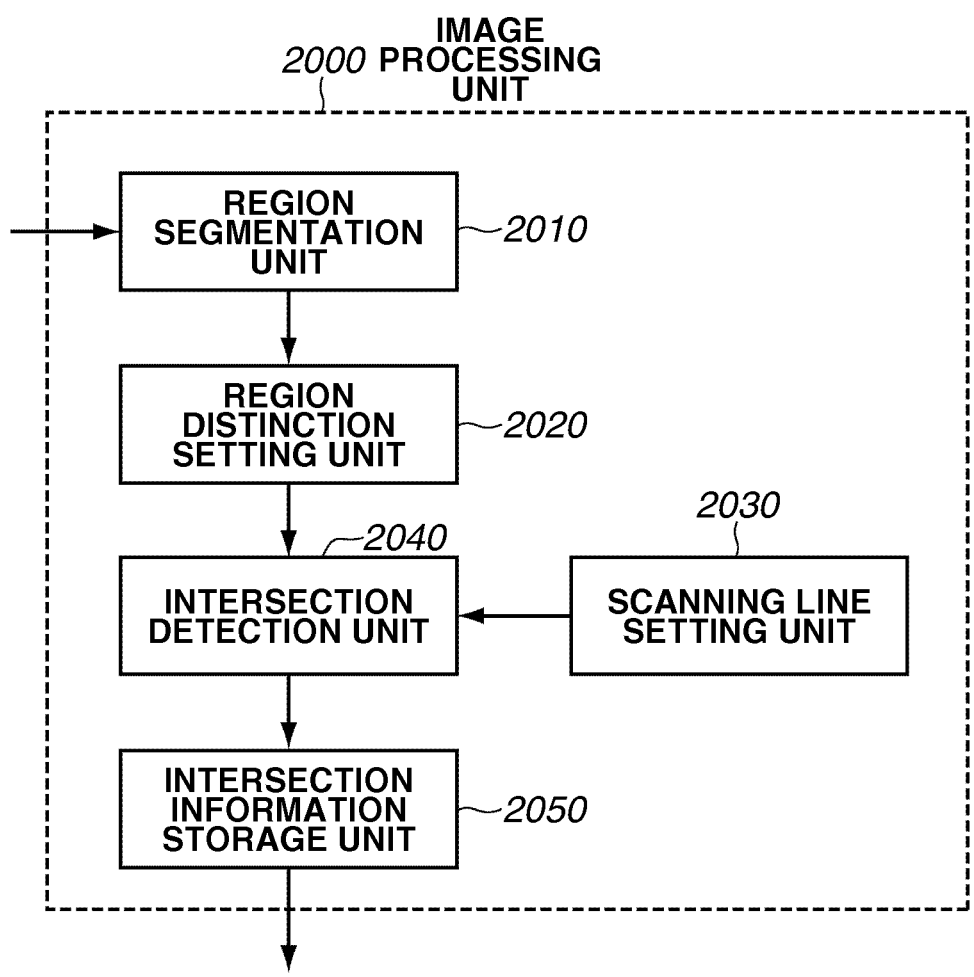
FIG. 3 illustrates an exemplary functional configuration of an image processing unit according to a first exemplary embodiment of the present invention.

The image processing unit 2000 will be described below. FIG. 3 illustrates an exemplary functional configuration of the image processing unit 2000 according to the first exemplary embodiment. As illustrated in FIG. 3, the image processing unit 2000 includes a region segmentation unit 2010, a region distinction setting unit 2020, a scanning line setting unit 2030, an intersection detection unit 2040, and an intersection information storage unit 2050.

The region segmentation unit 2010 performs region segmentation based on color information obtained from the image acquired by the image acquisition unit 1000. More specifically, the region segmentation unit 2010 segments the acquired image into regions included in preset color information for the real object 150 and other regions. For example, when the real object 150 is a human hand, the region segmentation unit 2010 segments it into regions of skin color and regions of other colors.

The region distinction setting unit 2020 applies labeling to the thus-segmented regions to distinguish the regions. More specifically, the region distinction setting unit 2020 applies labeling to the segmented regions in descending order of the area and then removes regions having an area equal to or smaller than a threshold value as noise. The region distinction setting unit 2020 removes noise in this way and then outputs the image and label information for the remaining regions to the intersection detection unit 2040.

The scanning line setting unit 2030 sets scanning line information for scanning lines corresponding to the respective images shot by the imaging apparatuses 100 and 110, and then outputs the scanning line information to the intersection detection unit 2040.

The intersection detection unit 2040 inputs the segmented regions labeled by the region distinction setting unit 2020 and the scanning line information set by the scanning line setting unit 2030, and detects intersections between boundary lines of the segmented-region (hereinafter referred to as segmented-region boundary lines) and the scanning lines. Detecting an intersection is obtaining image coordinates of the intersection on a two-dimensional image. The intersection detection unit 2040 outputs image coordinates of the detected intersections and labels of the segmented regions in proximity to the intersections to the intersection information storage unit 2050. The segmented regions in proximity to the intersections refer to segmented regions within a predetermined range from the intersections.

The intersection information storage unit 2050 inputs the image coordinates of the intersections (hereinafter referred to as intersections' image coordinates) and the labels of the segmented regions in proximity to the intersections (hereinafter referred to as segmented-region labels) from the intersection detection unit 2040, and retains them as intersection information. The intersection information storage unit 2050 outputs the intersection information (or the intersections' image coordinates) and the images of the labeled segmented regions to the correspondence processing unit 3000.

Figure 4:
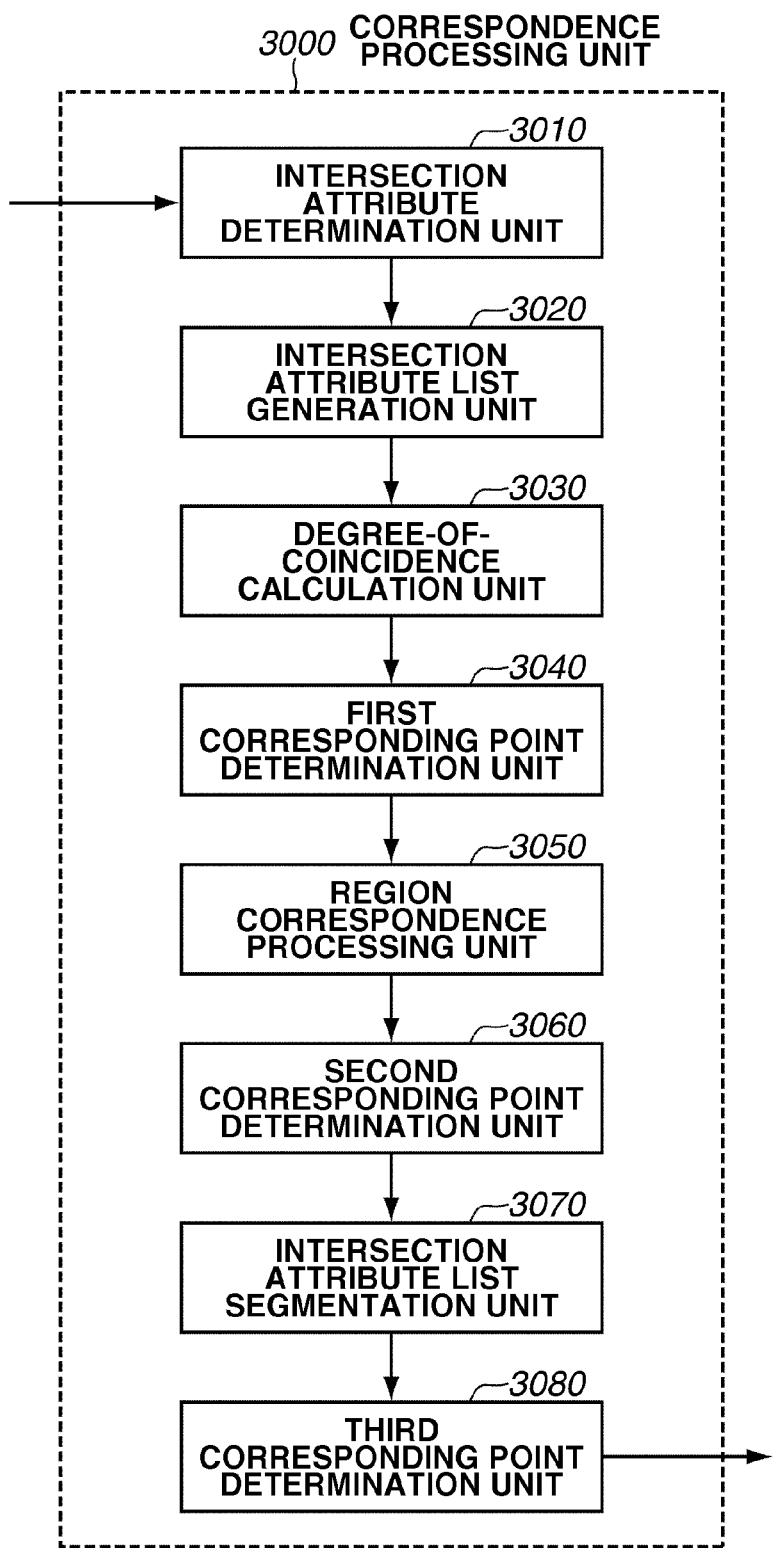
FIG. 4 illustrates an exemplary functional configuration of a correspondence processing unit.

The correspondence processing unit 3000 will be described below. FIG. 4 illustrates an exemplary functional configuration of the correspondence processing unit 3000. As illustrated in FIG. 4, the correspondence processing unit 3000 includes an intersection attribute determination unit 3010, an intersection attribute list generation unit 3020, a degree-of-coincidence calculation unit 3030, a first corresponding point determination unit 3040, a region correspondence processing unit 3050, and a second corresponding point determination unit 3060. The correspondence processing unit 3000 further includes an intersection attribute list segmentation unit 3070 and a third corresponding point determination unit 3080.

The intersection attribute determination unit 3010 inputs the intersections' image coordinates and the images of the labeled segmented regions from the image processing unit 2000. From the images of the segmented regions, the intersection attribute determination unit 3010 determines attributes on scanning lines in proximity to the intersections, and outputs the determined intersections' attributes to the intersection attribute list generation unit 3020.

The intersection attribute list generation unit 3020 inputs the intersections' attributes from the intersection attribute determination unit 3010, and generates an intersection attribute list in which the intersections' attributes are arranged in list form for each scanning line. The intersection attribute list generation unit 3020 outputs the generated intersection attribute list to the degree-of-coincidence calculation unit 3030.

The degree-of-coincidence calculation unit 3030 compares the intersection attribute list for the image shot by the imaging apparatus 100 with the intersection attribute list for the image shot by the second imaging apparatus 110, and calculates a degree of coincidence P of the intersections' attributes for each scanning line. The degree-of-coincidence calculation unit 3030 outputs the calculated degree of coincidence P to the first corresponding point determination unit 3040.

The first corresponding point determination unit 3040 inputs the degree of coincidence P of the intersection attribute lists from the degree-of-coincidence calculation unit 3030, and determines corresponding points based on the degree of coincidence P of the intersection attribute lists. The first corresponding point determination unit 3040 outputs, as corresponding point information, pairs of image coordinates of corresponding points to the region correspondence processing unit 3050.

The region correspondence processing unit 3050 inputs the corresponding point information from the first corresponding point determination unit 3040. The region correspondence processing unit 3050 applies correspondence processing to the segmented-region boundary lines where corresponding points exist, and outputs to the second corresponding point determination unit 3060 the labels of the segmented regions as correspondence information for the segmented-region boundary lines.

The second corresponding point determination unit 3060 inputs the correspondence information for the segmented-region boundary lines from the region correspondence processing unit 3050. The second corresponding point determination unit 3060 determines as new corresponding points the intersections between the boundary lines and the scanning lines updated by the region correspondence processing unit 3050, and outputs corresponding point information to the intersection attribute list segmentation unit 3070.

The intersection attribute list segmentation unit 3070 inputs the corresponding point information from the second corresponding point determination unit 3060, and segments the intersection attribute list based on the corresponding points. The intersection attribute list segmentation unit 3070 outputs the segmented intersection attribute list to the third corresponding point determination unit 3080.

The third corresponding point determination unit 3080 inputs the segmented intersection attribute list from the intersection attribute list segmentation unit 3070. Based on the degree of coincidence P of the segmented intersection attribute lists, the third corresponding point determination unit 3080 determines corresponding points, and outputs corresponding point information to the three-dimensional position calculation unit 4000.

The three-dimensional position calculation unit 4000 inputs the corresponding point information from the correspondence processing unit 3000, and calculates a three-dimensional position of the segmented regions for the imaging apparatus. Then, the three-dimensional position calculation unit 4000 outputs the calculated three-dimensional position information.

Figure 5:
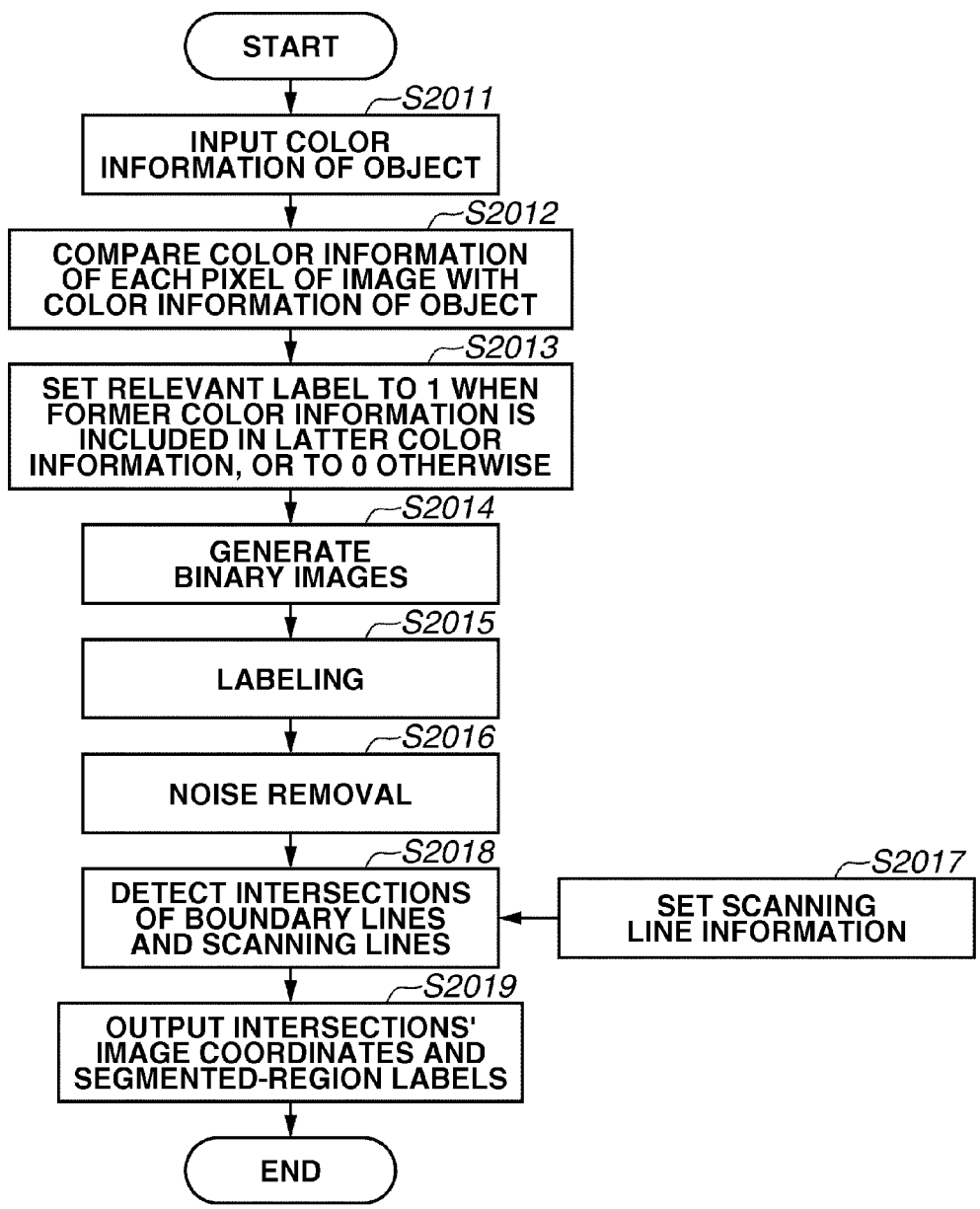
FIG. 5 is a flow chart illustrating exemplary processing by the image processing unit.

Processing by the image processing unit 2000 will be described in detail below. FIG. 5 is a flow chart illustrating exemplary processing by the image processing unit 2000.

In step S2011, the region segmentation unit 2010 inputs preregistered color information for an object (subject).

In step S2012, the region segmentation unit 2010 compares the color information for each pixel of the respective images shot by the imaging apparatuses 100 and 110 with the preregistered color information for the object.

In step S2013, when the color information for each pixel is included in the color information for the object, the region segmentation unit 2010 sets a relevant label to 1. Otherwise, it sets the relevant label to 0.

In step S2014, the region segmentation unit 2010 generates binary images based on a result of the color information comparison. When the color information for each pixel is included in the input color information, the region segmentation unit 2010 sets the color of a relevant region to white and the color of other regions to black.

In step S2015, the region distinction setting unit 2020 applies labeling to the binary images.

In step S2016, the region distinction setting unit 2020 removes regions where the area is smaller than a set threshold value, as noise from the binary images having undergone labeling.

Figure 6:
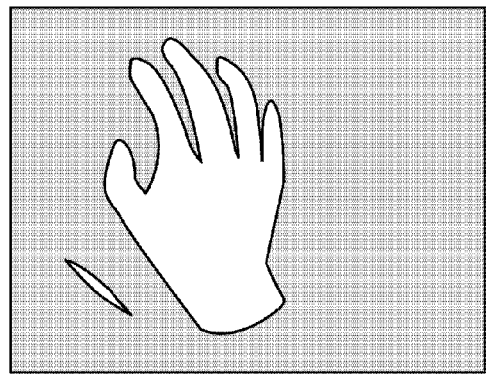
FIG. 6 illustrates exemplary binary images as a result of region segmentation containing noise.
Figure 6:
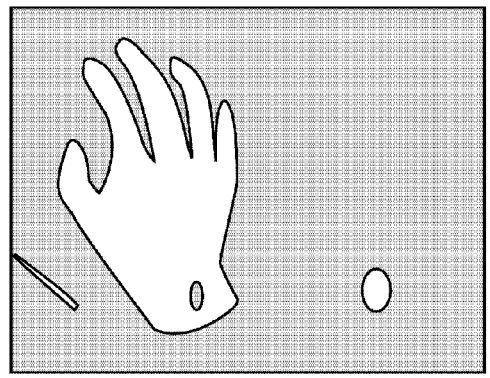

The above-mentioned method performs region segmentation based on the color information to detect object regions. Therefore, when there are shaded portions or regions having similar colors, the noise removal processing in step S2016 cannot completely remove incorrect detection and noise. FIG. 6 illustrates exemplary binary images containing noise as a result of the region segmentation.

The color information used in region segmentation can be described as coordinate values in a multi-dimensional color space. There are various types of color information such as RGB, YIQ, YCbCr, YUV, HSV, Luv, Lab, etc. The three-dimensional position measurement apparatus 200 may be configured to select color information to be used in region segmentation depending on the color characteristics of a target object. The method for performing region segmentation is not limited thereto. The region segmentation unit 2010 may perform region segmentation with any of known methods using color information.

Figure 7:
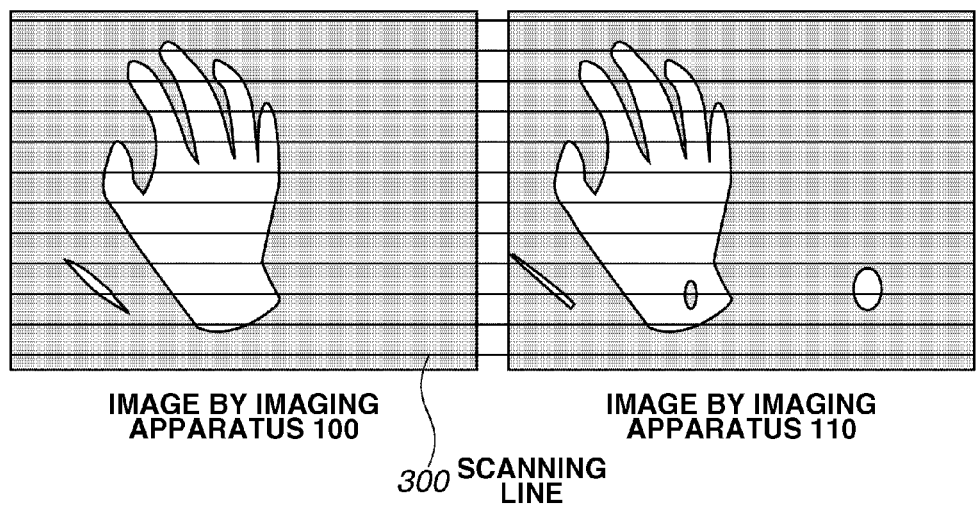
FIG. 7 illustrates exemplary segmented-region binary images displayed with scanning lines superimposed thereon.

In step S2017, the scanning line setting unit 2030 sets scanning line information. FIG. 7 illustrates exemplary segmented-region binary images displayed with scanning lines 300 superimposed thereon. The scanning line information includes scanning line formulas such as inclinations and segments, and the interval of scanning lines. In the present exemplary embodiment, the imaging apparatuses 100 and 110 are located so as to provide parallelly aligned optical-axis directions and the same viewpoint heights, and no image distortion is assumed. Therefore, when the vertical axis of an image plane is the y axis and the horizontal axis thereof is the x axis, the scanning line setting unit 2030 sets scanning lines such that line segments extending in the x-axis direction are arranged in the y-axis direction at equal intervals. Although the scanning line setting unit 2030 sets scanning lines by setting scanning line information, hereinafter, this processing will be simply referred to as setting scanning lines to simplify descriptions. Image coordinates of the real object detected by the imaging apparatus 100 are detected on the scanning lines for the image shot by the imaging apparatus 110. Likewise, image coordinates of the real object detected by the imaging apparatus 110 are detected on the scanning lines for the image shot by the imaging apparatus 100.

In step S2018, the intersection detection unit 2040 detects intersections between the segmented-region boundary lines and the scanning lines, and obtains relevant image coordinates.

In step S2019, the intersection information storage unit 2050 retains pairs of intersections' image coordinates and the labels of the segmented-region binary images, and outputs them to the correspondence processing unit 3000.

Figure 8:
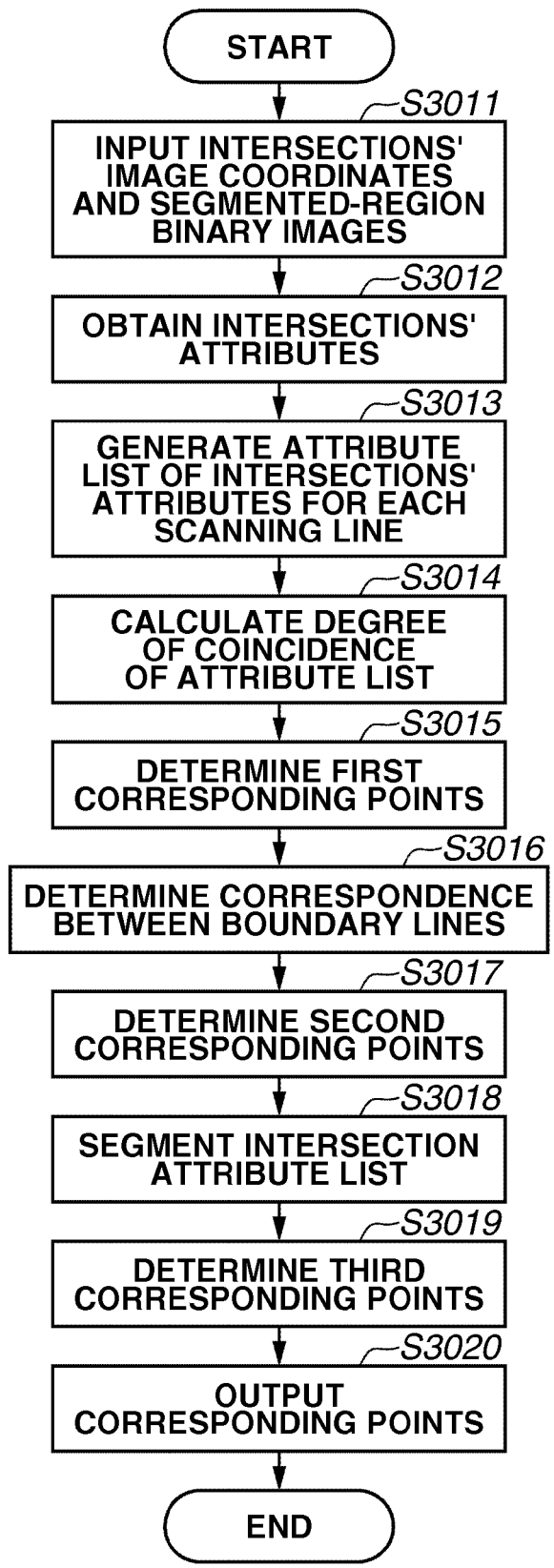
FIG. 8 is a flow chart illustrating exemplary processing by the correspondence processing unit.

Processing by the correspondence processing unit 3000 will be described in detail below. FIG. 8 is a flow chart illustrating exemplary processing by the correspondence processing unit 3000.

In step S3011, the intersection attribute determination unit 3010 inputs the intersections' image coordinates and the segmented-region binary images.

Figure 9:
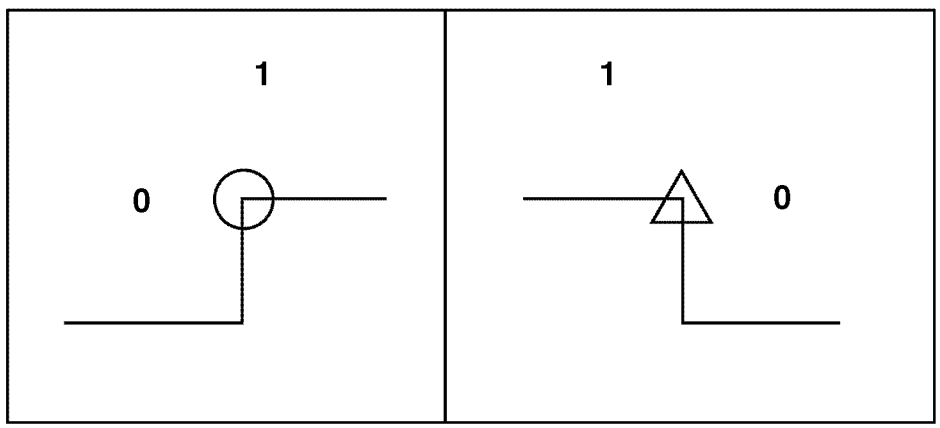
FIG. 9 illustrates how to obtain a feature amount of an intersection on a scanning line.
Figure 10:
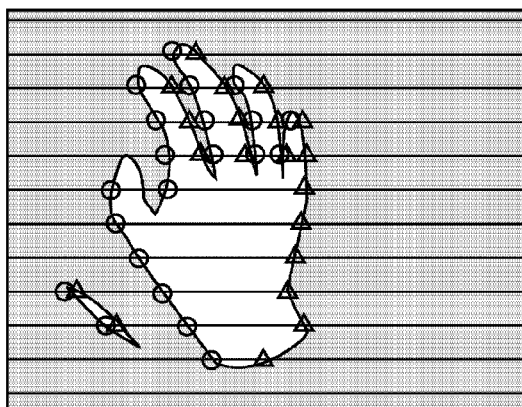
FIG. 10 illustrates an exemplary state where attributes in proximity to intersections are obtained and displayed on segmented regions.
Figure 10:
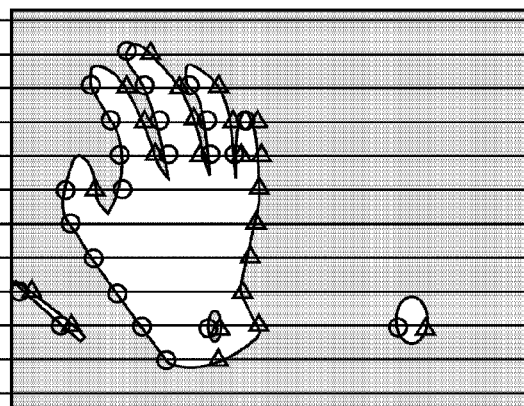

In step S3012, based on the segmented-region binary images, the intersection attribute determination unit 3010 obtains attributes in proximity to the intersections on the scanning lines. Assuming that portions detected as a region in the input color information set to 1 and other undetected portions set to 0, the intersection attribute determination unit 3010 probes a scanning line in the scanning direction (from left to right) and, if the segmented-region label changes from 0 to 1 on the intersection, gives the positive sign, as illustrated in FIG. 9. FIG. 9 illustrates how to obtain an attribute of an intersection on a scanning line. If the segmented-region label changes from 1 to 0 on the intersection, the intersection attribute determination unit 3010 gives the negative sign. Specifically, the positive sign means that the portion is on the left-hand side of the segmented region on the scanning line, and the negative sign means that the portion is on the right-hand side of the segmented region on the scanning line. In the present exemplary embodiment, the positive or negative sign is referred to as attribute. FIG. 10 illustrates an exemplary state where attributes in proximity to intersections are obtained and displayed on the segmented regions. Referring to FIG. 10, "○" denotes the positive sign and "Δ" denotes the negative sign.

In step S3013, the intersection attribute list generation unit 3020 generates an attribute list in which the attributes obtained in step S3012 are arranged in list form for each scanning line.

In step S3014, the degree-of-coincidence calculation unit 3030 calculates the degree of coincidence P of the attribute lists for the respective images shot by the imaging apparatuses 100 and 110. Specifically, the degree-of-coincidence calculation unit 3030 scans the attributes in the attribute list from left to right for each scanning line. When corresponding scanning lines have total numbers of intersections $S_{100}$ and $S_{110}$ on the respective images shot by the imaging apparatuses 100 and 110, and have a total number of intersections having the same attribute, C, the degree-of-coincidence calculation unit 3030 obtains the degree of coincidence P as follows:

$$P=C/S_{110}(S_{100} \leq S_{110})$$

$$P=C/S_{100}(S_{110} < S_{100})$$

The method for calculating the degree of coincidence P is not limited thereto as long as it is calculated based on the obtained attributes.

In step S3015, the first corresponding point determination unit 3040 determines corresponding points if the degree of coincidence P is equal to or larger than a threshold value T.

In step S3016, the region correspondence processing unit 3050 recognizes as object regions the segmented regions containing intersections determined to be corresponding points, and applies correspondence processing to the relevant boundary labels for the respective images shot by the imaging apparatuses 100 and 110.

In step S3017, the second corresponding point determination unit 3060 determines as corresponding points the intersections between the object region boundary lines and the scanning lines having undergone the correspondence processing in step S3016 but not yet having been determined to be corresponding points.

Figure 11:
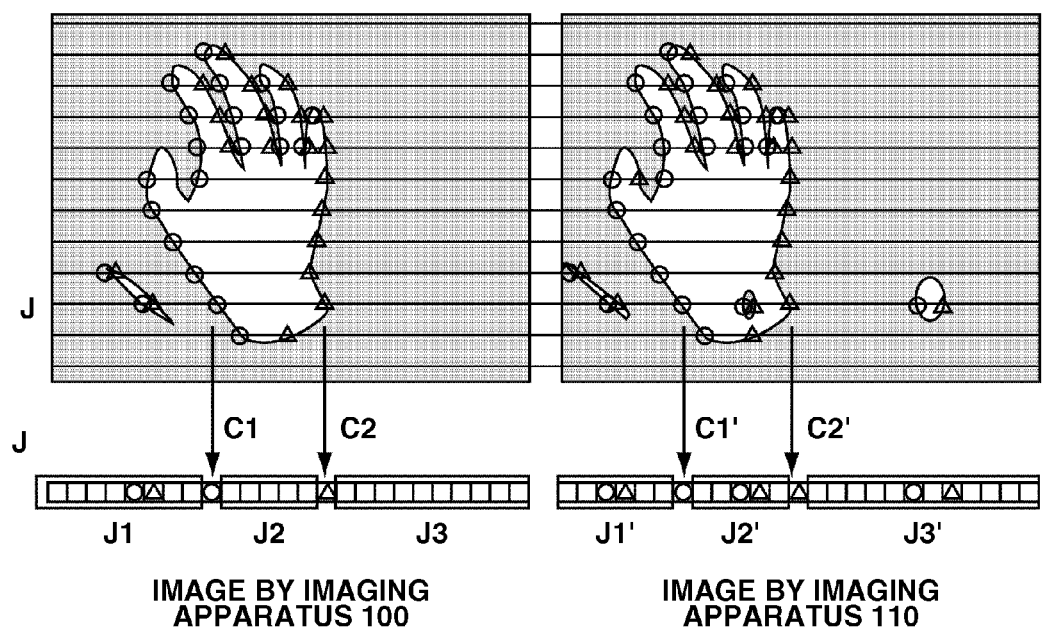
FIG. 11 illustrates an exemplary state where scanning lines are extracted based on intersections between segmented-region boundary lines and scanning lines.

In step S3018, the intersection attribute list segmentation unit 3070 segments the intersection attribute list in which the attributes in proximity to the intersections on the scanning lines are arranged in list form, at positions of the corresponding points having undergone the correspondence processing in step S3017. FIG. 11 illustrates an exemplary state where a scanning line J is extracted based on the intersections between the segmented-region boundary lines and the scanning lines. Referring to FIG. 11, corresponding points C1 and C2 are related to corresponding points C1' and C2', respectively, by the correspondence processing in step S3017. The intersection attribute list segmentation unit 3070 segments the intersection attribute list in which the attributes in proximity to the intersections on the scanning line J are arranged in list form, at positions of the corresponding points C1 and C2. Thus, the scanning line J for the image shot by the imaging apparatus 100 can be segmented into three portions J1, J2, and J3. Likewise, the scanning line J for the image shot by the imaging apparatus 110 can be segmented into three portions J1', J2', and J3'.

In step S3018, the intersection attribute list segmentation unit 3070 calculates the degree of coincidence P for each of the above-mentioned segmented intersection attribute lists. For example, the intersection attribute list segmentation unit 3070 calculates the degree of coincidence P between the corresponding points J1 and J1', between the corresponding points J2 and J2', and between the corresponding points J3 and J3' by performing similar processing to that of the degree-of-coincidence calculation unit 3030.

Figure 12:
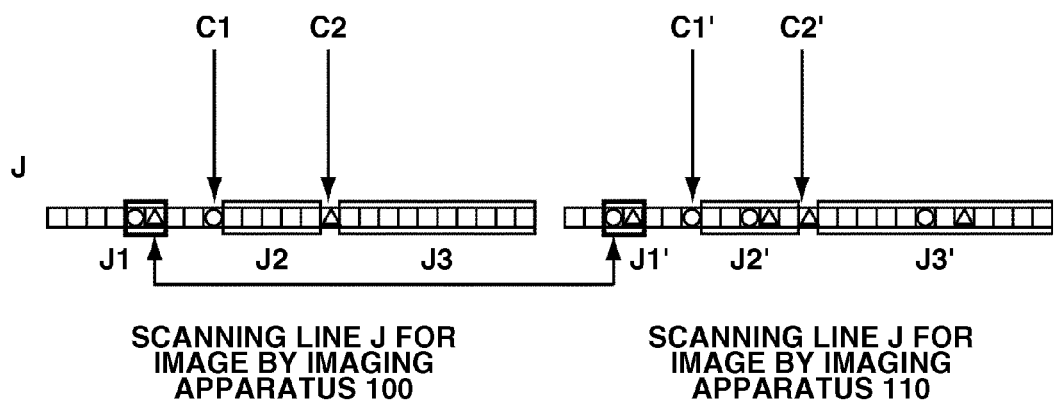
FIG. 12 illustrates exemplary processing for obtaining corresponding points on scanning lines.

In step S3019, the third corresponding point determination unit 3080 determines as new corresponding points the intersections not yet having been determined to be corresponding points, based on the degree of coincidence P calculated in step S3018. FIG. 12 illustrates exemplary processing for obtaining corresponding points on the scanning line J. Referring to FIG. 12, since the portions J1 and J1' have the same pattern of intersections' attributes, for example, the third corresponding point determination unit 3080 determines them as corresponding points.

In step S3020, the third corresponding point determination unit 3080 outputs pairs of image coordinates of corresponding points $C_n$ (n=1, 2, ..., N) in the image shot by the imaging apparatus 100 and corresponding points $C'_n$ (n=1, 2, ..., N) in the image shot by the imaging apparatus 110 to the three-dimensional position calculation unit 4000. N denotes the total number of pairs of corresponding points.

Processing by the three-dimensional position calculation unit 4000 will be described in detail below.

Figure 13:
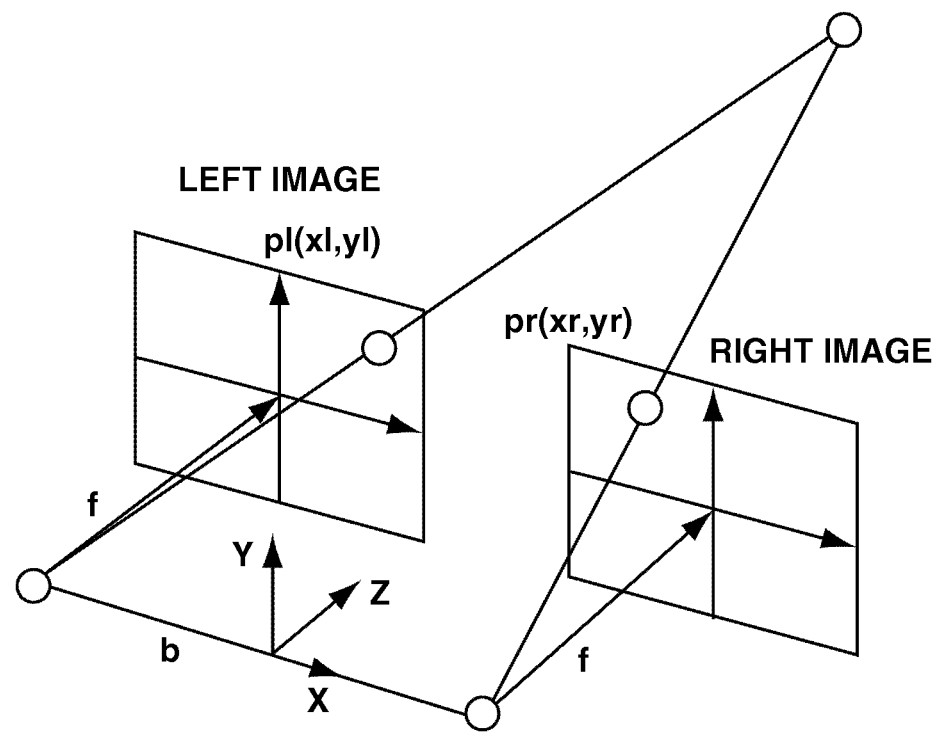
FIG. 13 illustrates exemplary stereo measurement.

The three-dimensional position calculation unit 4000 measures a three-dimensional position based on the corresponding points acquired from the correspondence processing unit 3000. FIG. 13 illustrates exemplary stereo measurement. In the present exemplary embodiment, as illustrated in FIG. 13, two imaging apparatuses are located so as to provide parallelly aligned optical-axis directions and the same viewpoint heights. Therefore, the three-dimensional position calculation unit 4000 calculates a three-dimensional position by using a known technique referred to as parallel stereo or baseline stereo.

With a coordinate system taken as illustrated in FIG. 13, when a point P (X, Y, Z) of a real object focuses at a position pl ($x_l$, $y_l$) on the left image and at a position ($x_r$, $y_r$) on the right image, the three-dimensional position calculation unit 4000 can calculate a three-dimensional position (X, Y, Z) by using the following formulas:

$$X = b(x_l + x_r)/2d \qquad (1)$$

$$Y = by/d \qquad (2)$$

$$Z = bf/d \qquad (3)$$

where f denotes a focal length of the imaging apparatuses, b denotes a distance (base length) between the imaging apparatuses, and d denotes parallax and is $x_l - x_r$.

The three-dimensional position calculation unit 4000 outputs the calculated three-dimensional position of the real object.

As mentioned above, the three-dimensional position measurement apparatus 200 according to the present exemplary embodiment is capable of measuring a three-dimensional position of a real object even if noise is contained in any object region detected from an image or even if there is a plurality of corresponding point candidates because of a concaved shape of the object region. Further, the three-dimensional position measurement apparatus 200 according to the present exemplary embodiment is capable of high-speed processing since it measures a three-dimensional position of a point on an object region boundary line without performing pattern matching for pixel patches. Further, the three-dimensional position measurement apparatus 200 according to the present exemplary embodiment is capable of accurately and stably detecting corresponding points by using, for example, the three-stage corresponding point determination units 3040, 3060, and 3080, and the region correspondence processing unit 3050. Thus, three-dimensional position measurement can be achieved with high precision and at high speed.

Suppose a case where the three-dimensional position measurement apparatus 200 according to the present exemplary embodiment is attached to a head-mounted display or a handheld display to apply it to the MR technology. In this case, the MR technology compares three-dimensional position information of a real object with three-dimensional position information of a virtual object to enable drawing the real object's image or the virtual object on the anterior side.

The head-mounted display refers to a display mounted on the head, and the handheld display refers to a portable display. These displays are generally used when the mixed reality is experienced. When attaching an imaging apparatus to a head-mounted display or handheld display, it is desirable to conform an optical axis of the display to an optical axis of the imaging apparatus. Thus, the MR technology measures a depth of an object region such as a human hand to correctly express an anteroposterior relation between real and virtual objects in the mixed reality, thus enabling a user to correctly perceive these objects.

As mentioned above, the three-dimensional position measurement apparatus 200 according to the present exemplary embodiment is capable of improving geometric consistency in the MR technology, thus providing a user with MR experience with little feeling of strangeness. Although the present exemplary embodiment has specifically been described based on a case where a three-dimensional position of a human hand is measured (calculated) as a real object, the real object is not limited thereto.

Although the first exemplary embodiment has specifically been described on a premise that the imaging apparatuses 100 and 110 are located so as to provide parallelly aligned optical-axis directions and the same viewpoint heights, the arrangement of the imaging apparatuses 100 and 110 is not limited thereto as long as they can shoot the same object.

If the imaging apparatuses 100 and 110 are not located so as to provide parallelly aligned optical-axis directions and the same viewpoint heights (if the imaging apparatuses 100 and 110 are not horizontally aligned), the scanning lines do not become in parallel with the x axis of the image unlike parallel stereo. In a second exemplary embodiment of the present invention, the three-dimensional position measurement apparatus 200 sets lines generally referred to as epipolar lines as scanning lines.

An epipolar line will be briefly described below. For example, suppose two viewpoints C and C' for the imaging apparatuses 100 and 110, and a certain point P in the three-dimensional space. In this case, the three-dimensional position measurement apparatus 200 can define a plane Σ in the three-dimensional space by using the three points C, C', and P. This plane is referred to as an epipolar plane, and a line segment formed by the epipolar plane and an image plane intersecting with each other is referred to as an epipolar line. The epipolar line can be obtained by an epipolar equation.

The epipolar equation will be described below. The position of each imaging apparatus is represented by a 3×1 vector $T=(T_x, T_y, T_z)$, and the rotation is represented by a 3×3 matrix R. A matrix E is defined as follows:

$$E = [T]_x R \qquad (4)$$

where $[T]_x$ is represented by the following formula:

$$[T]_x = \begin{bmatrix} 0 & -T_z & T_y \\ T_z & 0 & T_x \\ -T_y & T_x & 0 \end{bmatrix} \qquad (5)$$

When corresponding points on the respective images shot by the two imaging apparatuses are respectively represented by $x=[x, y, 1]^T$ and $x'=[x', y', 1]^T$ in a homogeneous coordinate system, the epipolar equation can be represented by the following formula:

$$x'^T E x = 0 \qquad (6)$$

This formula represents a relation between the corresponding points x and x' on the respective images, and, therefore, enables obtaining an epipolar line.

An epipolar line can be easily obtained in this way if a relative position and orientation between the two imaging apparatuses can be obtained. The relative position and orientation between the two imaging apparatuses can be obtained by a known camera calibration technique. Detailed descriptions on camera calibration will be omitted.

A three-dimensional position calculation method by using two imaging apparatuses located so as to provide neither parallelly aligned optical-axis directions nor the same viewpoint heights.

Internal parameters such as the focal length and the principal point position are assumed to be known, and external parameters for the relative position and orientation between the imaging apparatuses are also assumed to be known. A matrix P combines the internal and external parameters of each imaging apparatus, and can be represented by the following formula:

$$P = \begin{bmatrix} p11 & p12 & p13 & p14 \\ p21 & p22 & p23 & p24 \\ p31 & p32 & p33 & p34 \end{bmatrix} \quad (7)$$

The coordinates of a corresponding point detected in the image shot by the imaging apparatus 100 is $C_n=[u_n, v_n]$. When the position of a target point in the three-dimensional space is represented by $X=[X_n, Y_n, Z_n]$, it can be represented by the following formula:

$$\lambda \begin{bmatrix} u_n \\ v_n \\ 1 \end{bmatrix} = \begin{bmatrix} p11 & p12 & p13 & p14 \\ p21 & p22 & p23 & p24 \\ p31 & p32 & p33 & p34 \end{bmatrix} \begin{bmatrix} X_n \\ Y_n \\ Z_n \\ 1 \end{bmatrix} \quad (8)$$

$\lambda$ is a real number determined from the third row of formula (8). When formula (6) is expanded and then arranged in terms of X, Y, and Z, it can be represented by the following formula:

$$\begin{bmatrix} p31u_n - p11 & p32u_n - p12 & p33u_n - p13 \\ p31v_n - p21 & p32v_n - p22 & p33v_n - p23 \end{bmatrix} \begin{bmatrix} X_n \\ Y_n \\ Z_n \end{bmatrix} = \begin{bmatrix} p14 - p34u_n \\ p24 - p34v_n \end{bmatrix} \quad (9)$$

In the present exemplary embodiment, since the internal and external parameters of the imaging apparatus are known, parameters P are known. Two constraint formulas are obtained from an image shot by one imaging apparatus. When the imaging apparatus 110 has parameters P', and the coordinates of a corresponding point detected from a shot image is $C'_n=[u_n', v_n']$, four constraint formulas are obtained as follows:

$$\begin{bmatrix} p31u_n - p11 & p32u_n - p12 & p33u_n - p13 \\ p31v_n - p21 & p32v_n - p22 & p33v_n - p23 \\ p'31u'_n - p'11 & p'32u'_n - p'12 & p'33u'_n - p'13 \\ p'31v'_n - p'21 & p'32u'_n - p'12 & p'33u'_n - p'13 \end{bmatrix} \quad (10)$$

$$\begin{bmatrix} X_n \\ Y_n \\ Z_n \end{bmatrix} = \begin{bmatrix} p14 - p34u_n \\ p24 - p34v_n \\ p'14 - p'34u'_n \\ p'24 - p'34v'_n \end{bmatrix}$$

Formula (10) gives four constraint formulas for three unknown quantities. When formula (10) is defined as follows, $$M_n X_n = b_n \quad (11)$$

the least square solution of X is given by the following formula:

$$X_n = (M_n^T M_n)^{-1} M_n^T b_n \quad (12)$$

The three-dimensional position calculation unit 4000 calculates the least square solution for all of corresponding points to measure three-dimensional coordinates of the corresponding points existing on the object region boundary lines. Therefore, three-dimensional position calculation unit 4000 outputs as a target three-dimensional position value the Z coordinate of the three-dimensional coordinates of the object region obtained with reference to the imaging apparatus 100.

Thus, a three-dimensional position of a real object can be measured even if the imaging apparatuses 100 and 110 are located so as to provide neither parallelly aligned optical-axis directions nor the same viewpoint heights.

In the first exemplary embodiment, the scanning line setting unit 2030 sets scanning lines at equal intervals in the y-axis direction of an image. However, if an object region exists on a scanning line, the scanning line position setting is not limited thereto.

Figure 14:
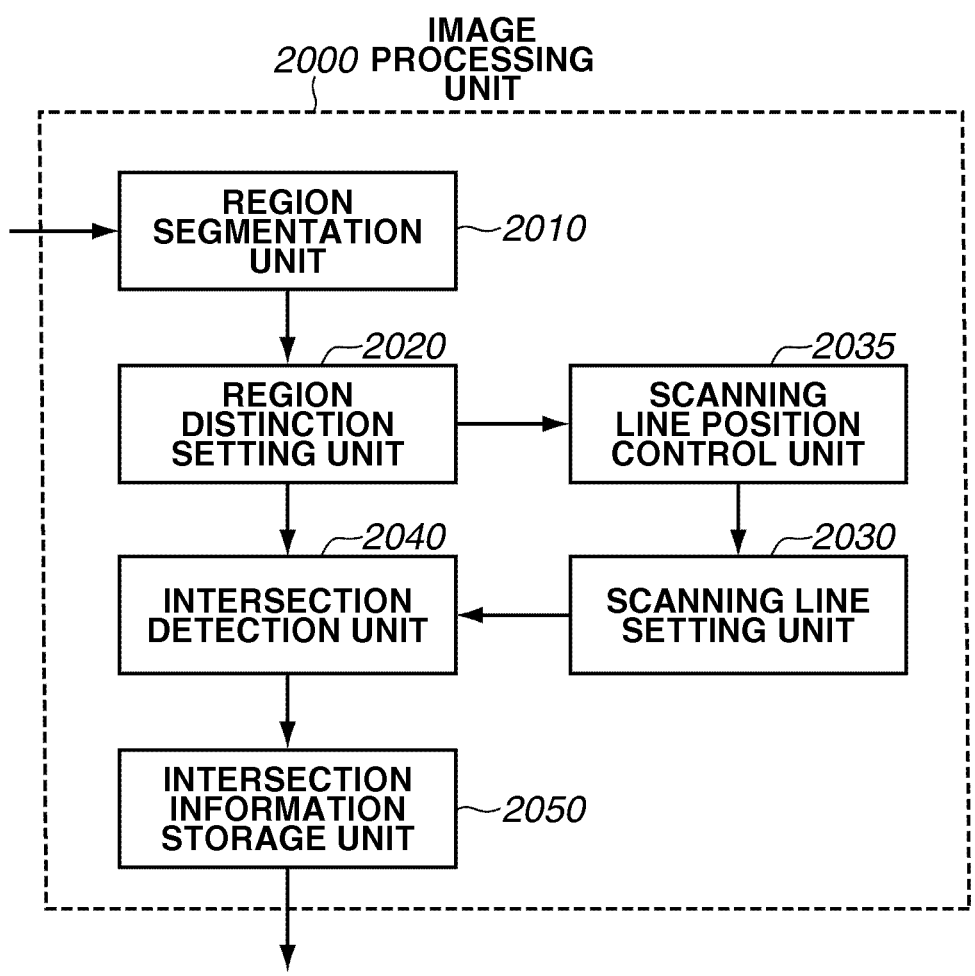
FIG. 14 illustrates an exemplary functional configuration of an image processing unit according to a third exemplary embodiment of the present invention.

A method for controlling the scanning line position setting will be described below with reference to FIG. 14. FIG. 14 illustrates an exemplary functional configuration of the image processing unit 2000 according to a third exemplary embodiment of the present invention. As illustrated in FIG. 14, a scanning line position control unit 2035 inputs the labeled segmented-region binary images from the region distinction setting unit 2020, and changes the positions of the scanning lines set by the scanning line setting unit 2030.

For example, the processing cost can be reduced if the scanning line setting unit 2030 sets scanning lines only on image regions containing a virtual object drawn in a preceding frame and on regions around the image regions, based on control processing by the scanning line position control unit 2035. Further, three-dimensional position measurement with higher accuracy can be achieved if the scanning line setting unit 2030 increases the density of scanning lines (shortens the interval of scanning lines) only on regions containing a virtual object drawn by a preceding frame, based on control processing by the scanning line position control unit 2035.

Figure 15:
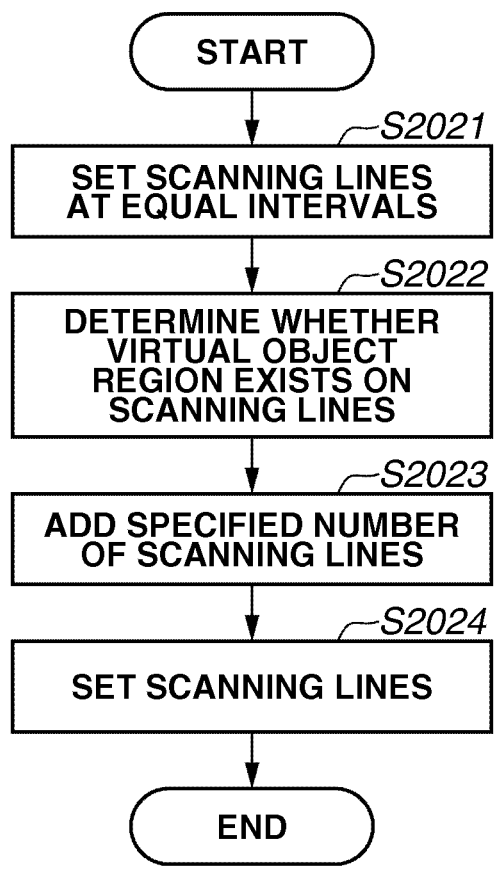
FIG. 15 is a flow chart illustrating exemplary processing for changing the interval between scanning lines depending on regions containing a virtual object drawn in a preceding frame.

FIG. 15 is a flow chart illustrating exemplary processing for changing the interval of scanning lines depending on regions containing a virtual object drawn in a preceding frame.

In step S2021, the scanning line setting unit 2030 sets scanning lines at equal intervals.

In step S2022, the scanning line position control unit 2035 sets a determination flag depending on whether a virtual object region exists on a scanning line. If a virtual object region does not exist on the scanning line, the scanning line position control unit 2035 sets a relevant determination flag to 0 not to use the scanning line. If a virtual object region exists on the scanning line, the scanning line position control unit 2035 sets the relevant determination flag to 1.

In step S2023, if there are two contiguous scanning lines with the determination flag set to 1, the scanning line position control unit 2035 adds specified number of scanning lines between the two scanning lines and then sets relevant determination flags to 1.

In step S2024, the scanning line setting unit 2030 sets lines with the determination flag set to 1 as scanning lines.

As mentioned above, the scanning line position control unit 2035 controls scanning line positions so as not to use scanning lines on regions containing no object and so as to increase the density of scanning lines on only regions containing an object, thus achieving three-dimensional position measurement with higher accuracy.

In the above-mentioned first to third exemplary embodiments, the image processing unit 2000 performs region segmentation based on preregistered object color information and then generates binary images. However, a plurality of pieces of color information may be preregistered.

In this case, the region segmentation unit 2010 can perform region segmentation for each of the plurality of pieces of color information preregistered and then generates multivalued images.

The region distinction setting unit 2020 sets an identifier Li (i=1, 2, . . . , C) for each piece of color information and then assigns the identifier Li to each segmented region, where C denotes the total number of pieces of color information registered, i.e., the total number of identifiers Li.

Further, in the first to third exemplary embodiments, the correspondence processing unit 3000 probes a scanning line, and gives the positive sign if a segmented-region identifier changes from 0 to 1 on an intersection or the negative sign if it changes from 1 to 0. However, when the region segmentation unit 2010 performs region segmentation based on a plurality of pieces of color information, the intersection attribute determination unit 3010 obtains pairs of identifiers Li in terms of the change in proximity to an intersection on a scanning line, as attributes.

The intersection attribute list generation unit 3020 arranges the pairs of identifiers Li obtained as attributes on the scanning line to form a list of intersection attributes.

The degree-of-coincidence calculation unit 3030 scans the pairs of identifiers Li which are attributes on the scanning line to obtain the degree of coincidence P based on whether the attributes coincide with each other.

The above-mentioned processing associates points on an object region having a plurality of pieces of color information, thus achieving three-dimensional position measurement.

The present invention is achieved also by performing the following processing. Specifically, software (program) implementing the functions of the above-mentioned exemplary embodiments is supplied to a system or apparatus through a network or various memory media, and a computer (or CPU or micro processing unit (MPU)) in the system or apparatus loads and executes the program.

Each of the above-mentioned exemplary embodiments enables measuring a three-dimensional position of an object even if noise is contained in an object region detected from an image or even if there is a plurality of corresponding point candidates because of a concaved shape of the object region. Further, each of the exemplary embodiments measures a three-dimensional position of a point on an object region boundary line without performing processing involving a large amount of calculations such as pattern matching of pixel patches based on luminance information, thus achieving high-speed processing.

Each of the above-mentioned exemplary embodiments performs region segmentation based on color information obtained from images, and associates intersections between the images for each scanning line based on attributes of intersections between scanning lines obtained based on segmented regions and region boundary lines. Therefore, even if there is a plurality of corresponding point candidates having a similar luminance gradient, incorrect correspondence processing can be reduced in comparison to the conventional case where correspondence processing is performed by directly using the luminance gradient.

Thus, a three-dimensional position of a real object can be stably measured (calculated) at high speed.

Further, it becomes possible to compare the measured three-dimensional position information for the real object with three-dimensional position information for a virtual object to draw the real object's image or the virtual object on the anterior side. The three-dimensional position measurement apparatus according to the present invention is capable of correctly expressing an anteroposterior relation between real and virtual objects in the mixed reality and improving geometric consistency in the MR technology, thus providing a user with MR experience with little feeling of strangeness.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-149713 filed Jun. 30, 2010, which is hereby incorporated by reference herein in its entirety.

What is claimed is:

1. An apparatus comprising a memory and at least one processor that executes a program to function as:

a region extraction unit configured to extract a first region having predetermined color information from a first image sensed by an imaging apparatus in a first viewpoint and a second region having the predetermined color information from a second image sensed by an imaging apparatus in a second viewpoint different from the first viewpoint;

a first determination unit configured to determine whether a first area of the extracted first region in the first image is larger than a first threshold value, and determine whether a second area of the extracted second region in the second image is larger than a second threshold value;

an obtaining unit configured to obtain first intersection points where a first line set in the first image intersects first pixels of an outline of the first region, and the first determination unit determines that the first area of which in the first image is larger than the first threshold value, and obtain second intersection points where a second line set in the second image intersects second pixels of an outline of the second region, and the first determination unit determines that the second area of which in the second image is larger than the second threshold value;

an attribute determination unit configured to determine first attributes which indicate whether the first pixels at the obtained first intersection points are on a right side or on a left side of the first region in the first image, and determine second attributes which indicate whether the second pixels at the obtained second intersection points are on a right side or on a left side of the second region in the second image;

a second determination unit configured to determine whether the first attributes of the first intersection points on the first line set in the first image match with second attributes of the second intersection points on the second line set in the second image;

a correspondence processing unit configured to obtain corresponding points between the first image and the second image based on a result of the second determination unit; and a calculation unit configured to calculate at least a depth value of an object based on obtained corresponding points.

2. The apparatus according to claim 1, further comprising: a line setting unit configured to set lines on each image.

3. The apparatus according to claim 1, wherein the imaging apparatus comprises two imaging apparatuses attached to a head-mounted display or handheld display.

4. The apparatus according to claim 2, wherein the imaging apparatus comprises two imaging apparatuses located so as to provide parallelly aligned optical-axis directions and the same viewpoint heights, and wherein the line setting unit sets lines as a plurality of line segments arranged in each image of the object shot by the two imaging apparatuses, in parallel with a line segment connecting the two imaging apparatuses.

5. The apparatus according to claim 2, wherein the lines are epipolar lines.

6. The apparatus according to claim 2, further comprising: a scanning line position control unit configured to control positions of the lines set by the line setting unit according to the regions extracted by the region extraction unit in each image.

7. The apparatus according to claim 1, further comprising: a generation unit configured to generate a first set of the first attributes of the first intersection points in the first line in the first image and generate a second set of the second attributes of the second intersection points in the second line in the second image, wherein the second determination unit is configured to determine whether the first set of the first attributes of the first intersection points in the first line in the first image matches with the second set of the second attributes of the second intersection points in the second line in the second image.

8. The apparatus according to claim 7, wherein the correspondence processing unit calculates a degree of coincidence of the first set of the first attributes and the second set of the second attributes generated by the generation unit for each line, and obtains corresponding points between the first image and the second image based on the calculated degree of coincidence.

9. The apparatus according to claim 8, wherein the correspondence processing unit obtains, out of intersections not determined to be corresponding points based on calculated degree of coincidence, other intersections on the lines passing the intersections determined to be corresponding points based on the calculated degree of coincidence, as a corresponding point.

10. A method performed by an information processing apparatus, the method comprising:

extracting a first region having predetermined color information from a first image sensed by an imaging apparatus in a first viewpoint and a second region having the predetermined color information from a second image sensed by an imaging apparatus in a second viewpoint different from the first viewpoint;

first determining to determine whether a first area of the extracted first region in the first image is larger than a first threshold value, and determine whether a second area of the extracted second region in the second image is larger than a second threshold value;

obtaining first intersection points where a first line set in the first image intersects first pixels of an outline of the first region, and the first determining determines that the first area of which in the first image is larger than the first threshold value, and obtaining second intersection points where a second line set in the second image intersect second pixels of an outline of the second region, and the first determining determines that the second area of which in the second image is larger than the second threshold value;

attribute determining to determine first attributes which indicate whether the first pixels at the obtained first intersection points are on a right side or on a left side of the first region in the first image, and determine second attributes which indicate whether the second pixels at the obtained second intersection points are on a right side or on a left side of the second region in the second image;

second determining to determine whether first attributes of the first intersection points on the first line set in the first image match with second attributes of the second intersection points on the second line set in the second image;

obtaining corresponding points between the first image and the second image based on a result of the second determining; and calculating at least a depth value of an object based on the obtained corresponding points.

11. A non-transitory computer-readable storage medium storing a program for causing a computer to execute a method comprising:

extracting a first region having predetermined color information from a first image sensed by an imaging apparatus in a first viewpoint and a second region having the predetermined color information from a second image sensed by an imaging apparatus in a second viewpoint different from the first viewpoint;

first determining whether an area of the extracted first region in the first image and the second image is larger than a first threshold value, and determining whether an area of the extracted second region in the second image is larger than a second threshold value;

obtaining first intersection points where a first line set in the first image intersects first pixels of outline of the first region, and the first determining determines that the first area of which in the first image is larger than the first threshold value, and obtaining second intersection points where a second line set in the second image intersect second pixels of outline of the second region, and the first determining determines that the second area of which in the second image is larger than the second threshold value;

attribute determining to determine first attributes which indicate whether the first pixels at the obtained first intersection points are on a right side or on a left side of the first region in the first image, and determine second attributes which indicate whether the second pixels at the obtained second intersection points are on a right side or on a left side of the second region in the second image;

second determining to determine whether first attributes of the first intersection points on the first line set in the first image match with second attributes of the second intersection points on the second line set in the second image;

obtaining corresponding points between the first image and the second image based on a result of the second determining; and calculating at least a depth value of an object based on the obtained corresponding points.

12. The apparatus according to claim 1, further comprising:

a composition unit configured to compose each of the first image and the second image including the object with a virtual image, using a calculated depth value of the object.

13. A system comprising:

a head mount display having an imaging unit which senses a real image and a display unit which displays a composite image; and an image processing apparatus which generates the composite image to be displayed in the display unit, by composing the real image with a virtual image, wherein the image processing apparatus further comprises:

a region extraction unit configured to extract a first region having a predetermined color information from a first image sensed by an imaging apparatus in a first viewpoint and a second region having the predetermined color information from a second image sensed by an imaging apparatus in a second viewpoint different from the first viewpoint;

a first determination unit configured to determine whether a first area of the extracted first region in the first image and the second image is larger than a first threshold value and determine whether a second area of the extracted second region in the second image is larger than a second threshold value;

an obtaining unit configured to obtain first intersection points where a first line set in the first image intersects first pixels of an outline of the first region, and the first determination unit determines that the first area of which in the first image is larger than the first threshold value, and obtain second intersection points where a second line set in the second image intersects second pixels of an outline of the second region, and the first determination unit determines that the second area of which in the second image is larger than the second threshold value;

an attribute determination unit configured to determine first attributes which indicate whether the first pixels at the obtained first intersection points are on a right side or on a left side of the first region in the first image, and determine second attributes which indicate whether the second pixels at the obtained second intersection points are on a right side or on a left side of the second region in the second image;

a second determination unit configured to determine whether the first attributes of the first intersection points on the first line set in the first image match with the second attributes of the second intersection points on the second line set in the second image;

a correspondence processing unit configured to obtain corresponding points between the first image and the second image based on a result of the second determination unit;

a calculation unit configured to calculate at least a depth value of an object based on the obtained corresponding points; and a composition unit configured to compose each of the first image and the second image including the object with the virtual image, using a calculated depth value of the object.

14. The apparatus according to claim 1, wherein the attribute represents a change of colors between inside and outside of the extracted first region and second region in relation to a predetermined direction.

15. The apparatus according to claim 1, wherein the region extraction unit is configured to extract a region of a human hand.

16. The apparatus according to claim 7, further comprising:

a dividing unit configured to divide the first set of the first attributes of the first intersection points in the first line in the first image and the second set of the second attributes of the second intersection points in the second line in the second image based on a result of the second determination unit, wherein the second determination unit determines further whether the divided sets of the attributes of the intersection points match between the first image and the second image.

17. The apparatus according to claim 1, wherein the determination unit determines whether each attribute of the intersection points in each line matches between the first image and the second image and determines whether the sets of the attributes of the intersection points in each line matches between the first image and the second image based on a number of intersection points, of which attributes are determined to match between the first image and the second image.

* * * * *